J. H. A. BOUSFIELD.
PLATFORM SCALE.
APPLICATION FILED SEPT. 20, 1917.
1,277,038.
Patented Aug. 27, 1918.
3 SHEETS—SHEET 1.
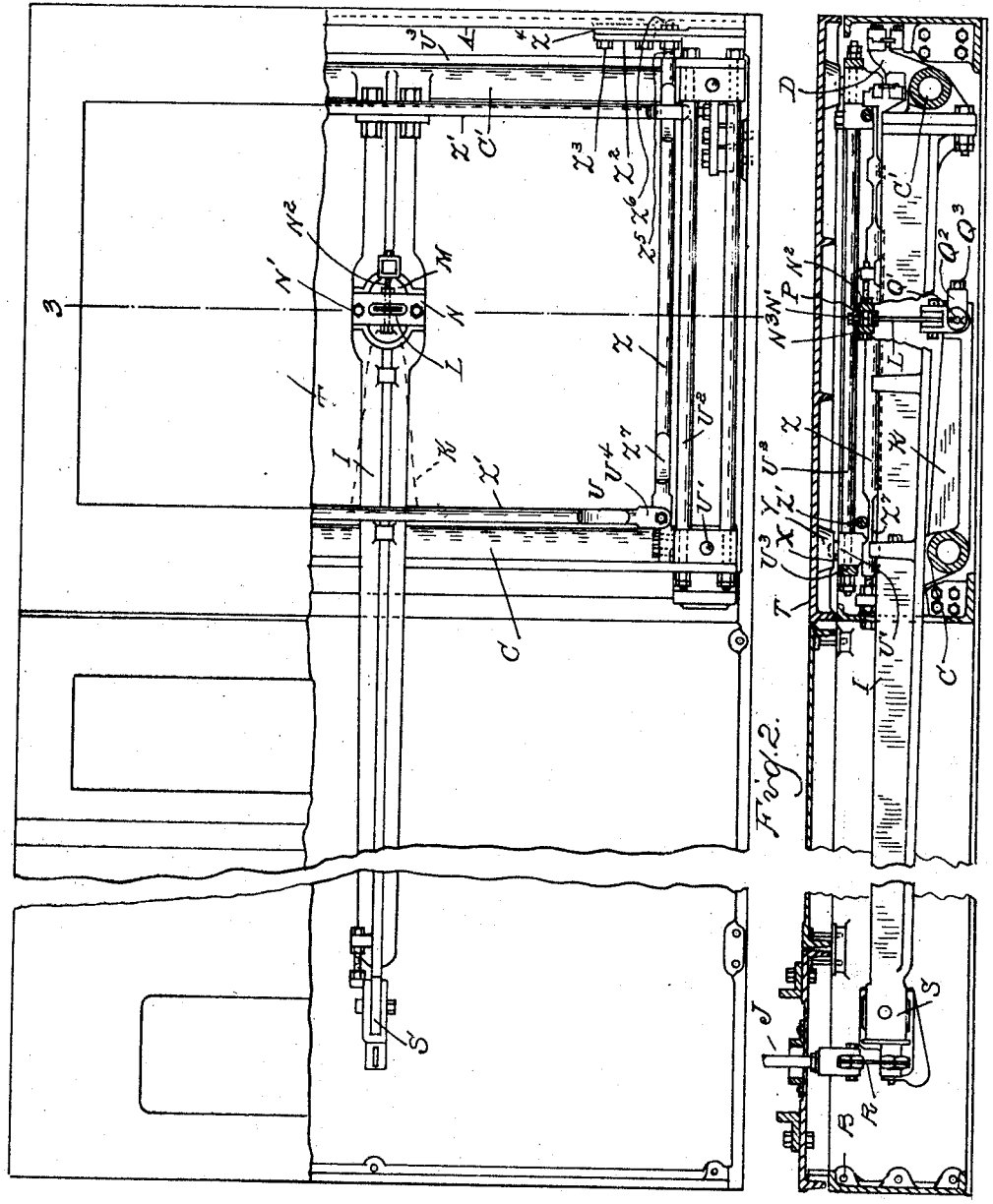
Inventor
John H. A. Bousfield
By Whittemore Hulbert & Whittemore
Attorneys J. H. A. BOUSFIELD.
PLATFORM SCALE.
APPLICATION FILED SEPT. 20, 1917.
1,277,038.
Patented Aug. 27, 1918.
3 SHEETS—SHEET 2.
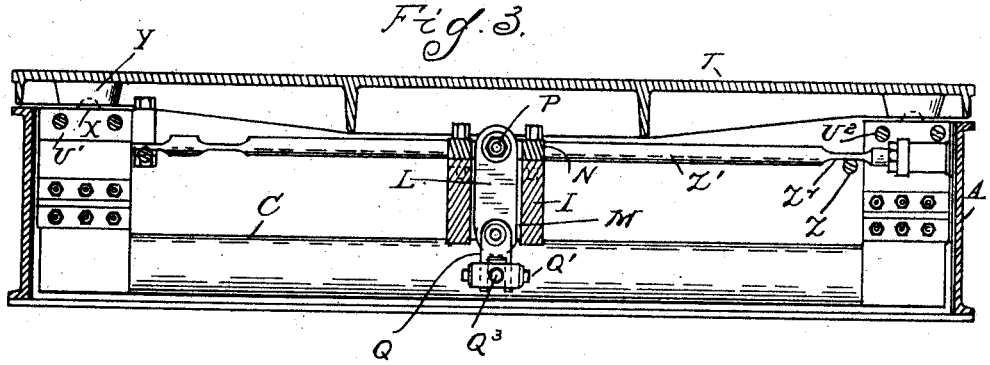
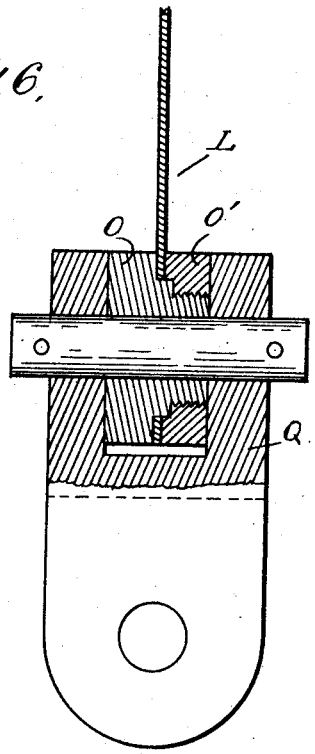

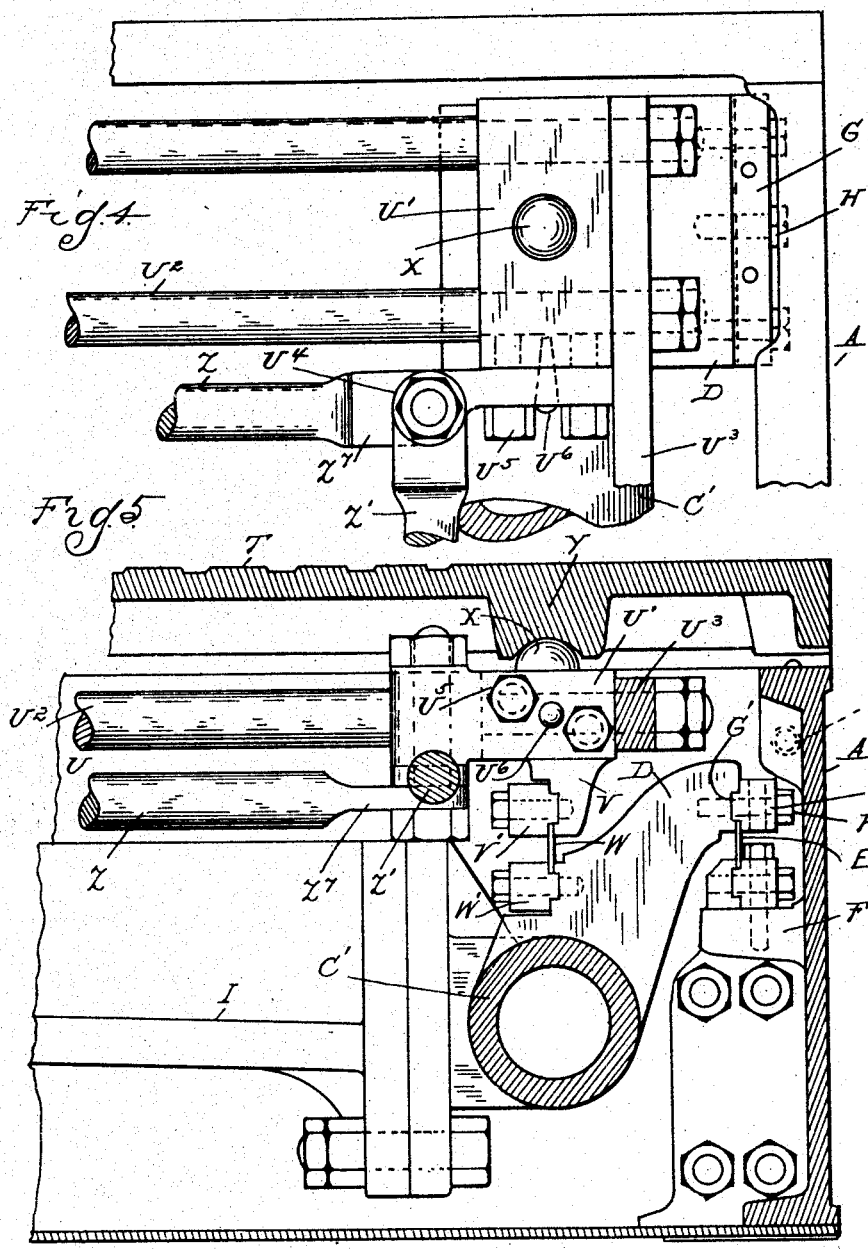

UNITED STATES PATENT OFFICE.

JOHN H. A. BOUSFIELD, OF ST. JOHNSBURY, VERMONT, ASSIGNOR TO E. AND T. FAIRBANKS AND COMPANY, OF ST. JOHNSBURY, VERMONT, A CORPORATION OF VERMONT.

PLATFORM-SCALE.

1,277,038.        Specification of Letters Patent.     Patented Aug. 27, 1918.

Application filed September 20, 1917. Serial No. 192,293.

*To all whom it may concern:*

Be it known that I, JOHN H. A. BOUSFIELD, a citizen of the United States of America, residing at St. Johnsbury, in the county of Caledonia and State of Vermont, have invented certain new and useful Improvements in Platform-Scales, of which the following is a specification, reference being had therein to the accompanying drawings.

The invention relates to scales of that type employing flexible plate fulcrums, and the invention comprises various features of construction as hereinafter set forth.

In the drawings:

Figure 1 is a plan view of the scale;

Fig. 2 is a longitudinal section thereof;

Fig. 3 is a cross-section on line 3—3 Fig. 1;

Figs. 4 and 5 are respectively top plan and side elevational views of corner construction of the scale.

Fig. 6 is a sectional plan view of a detail.

The scale is preferably formed of beams A of channel or I cross-section and which are secured to each other at their corners by bolts B. C and C' are hollow pipe-rockers extending transversely of the frame and provided at opposite ends with the outwardly-projecting arms D for engagement with the plate fulcrums E. The latter are secured to brackets F projecting inward from the frame side-bars A, preferably formed integral therewith. The plate fulcrums are secured to the arms D and brackets F by clamping plates G. These are formed with longitudinally-extending tongue portions G' for engaging corresponding grooves in the member to which they are secured, the tongues forming a true bearing for the edge of the plate. Cap screws H are employed for securing the plates and exerting the clamping pressure.

The pipe-rocker C' is provided with a long lever arm I, which extends centrally of the base and at its outer end is attached to the steelyard rod connection J leading to the scale beam (not shown). The rocker C is provided with an oppositely-extending short arm K and this is connected with the long arm I by a suspension link L. This link passes through a central aperture M in the long arm, being secured thereto through the medium of an adjustable cross-bar N attached by screws N' passing through slotted holes and being adjusted by a central longitudinally-extending screw N². The link L is formed from thin sheet-metal apertured at its opposite ends and reinforced by a shouldered bushing O and a clamping-plate O' secured thereon. This provides a longer bearing for the pivot pin P which passes through the cross-bar and the link. The lower end of the link is similarly attached to a yoke member Q for connecting the same to the short lever arm, the pin Q' passing through a slotted bearing in said lever arm and being adjustable by the yoke Q² and adjusting screw Q³. Thus by adjusting the screws Q³ and N², the link may be accurately adjusted in relation to the long and short lever arms. The long lever arm is attached to the steelyard rod J by a similar construction of link R engaging an adjustable nose-piece S on said lever.

The platform T is supported on the levers through the medium of a platform-supporting frame U. This is preferably formed of bearing blocks U' arranged at the four corners thereof, these being cross-connected by shouldered rods U² and longitudinal flat-bars U³. Each block is provided with a depending lug V which has a machined, grooved side face for coöperating with a tongued clamping member V' similar in construction to the members G. W is a flexible plate clamped between the member V' and lug V, the lower edge of said plate being similarly clamped between a clamping member W' and the arm D of the lever. The blocks U' are provided on their upper faces with convex bearings X which engage concave bearings of greater radius in the flat core member Y. The point of contact between these bearings is in the plane of the flexible plates W, and on account of the arc-shaped form any distortion in the platform, due to loading, will not change the alinement of the point of bearing with the flexible plates.

To maintain the platform and its supporting frame from longitudinal or lateral displacement, stay rods are provided which anchor the platform-supporting frame to the outer frame and at the same time permit freedom for vertical movement. These rods Z and Z', extending respectively longitudinally and transversely of the platform, are pivotally connected to the corner blocks U' at one end through the medium of eye bearing blocks U⁴, and at their opposite ends are attached to a member Z² secured by bolts Z³ to the side-bars A. The member Z² bears against a lug or boss Z⁴ on said side-bar A, and has a portion projecting beyond the lug and spaced from the bar, to which the stay-rod is attached. This permits of securing the stay-rod by threading the end thereof at Z⁵ and placing clamping nuts Z⁶ on opposite sides of the member Z². Thus by adjusting these nuts in either direction the rod is adjusted longitudinally and will correspondingly adjust the platform-supporting frame so as to properly aline the platform bearings with the flexible supporting plates. The stay-rods Z and Z' are further provided with thin portions Z⁷ adjacent to opposite ends thereof, which permit of vertical movement of the platform and its supporting frame without permitting any longitudinal or transverse movement. The construction described is one which is purely mechanical and which at the same time permits of delicate adjustment to insure accuracy in the operation of the scale. This accuracy is largely dependent upon the true alinement of the flexible bearings with the points of support for the platform and upon the accurate length of the lever arms. The former is secured by the adjustment of the stay-rods, while the latter is obtained by adjusting the nose pieces on the lever arms and the cross-bar N. The shouldered rods which connect the corner blocks of the platform-supporting frame serve to hold the latter in absolute parallelism and also with accurate spacing of the flexible plate fulcrums. The construction is also one which is easily manufactured, as the machining operations are performed upon the separate elements instead of requiring an operation on the assembled frame.

The blocks U⁴ which form the pivotal connection between the stay-rods Z and Z' and the corner blocks U' are attached to the latter by tap bolts U⁵, and accurate positioning of the eye for the pivot is obtained by a tapering pin U⁶ connecting the block U⁴ with the block U. This tapering pin will always bring the blocks in a predetermined relation to each other, while the bolts U⁵ will clamp the parts in this position. Tapering pins are also employed for exactly locating the flexible fulcrum clamping plates on the frame.

What I claim as my invention is:

1. In a scale, the combination with a rigid frame and platform-supporting levers fulcrumed therein, of a platform-supporting frame within said rigid frame comprising corner blocks and longitudinal and transverse connecting bars therefor, flexible plate fulcrums secured to said corner blocks and to the platform levers, and stay-rods connecting said corner blocks with said rigid frame, flexible to permit vertical movement of the platform-supporting frame and longitudinally adjustable to aline said flexible plate fulcrums.

2. In a scale, the combination with a rigid frame and platform-supporting levers fulcrumed therein, of a platform-supporting frame comprising side-bars and a corner block, a flexible plate fulcrum depending from said corner block and attached to said platform-supporting lever, a stay-rod connecting said corner block with said rigid frame flexible to permit vertical oscillations of the platform-supporting frame, and means for adjusting said stay-rod longitudinaly to aline said flexible plate fulcrum.

3. In a scale, a platform-supporting frame comprising corner blocks having depending lugs for attachment to plate fulcrums, rods connecting said corner blocks to each other, and means for accurately positioning one of said corner blocks.

4. In a scale, a platform-supporting frame comprising corner blocks provided with depending lugs for attachment to flexible plate fulcrums, rods for connecting said corner blocks, and a stay-rod attached at one end to said corner block and adjustably anchored at its opposite end, said rod being flexible to permit vertical oscillation.

5. In a scale, a platform-supporting frame comprising corner blocks, pairs of shouldered rods connecting pairs of corner blocks, and transversely-extending rods for connecting said connected pairs.

6. In a scale, a platform-supporting frame comprising corner blocks having plate fulcrum bearings formed thereon, and parallelly-arranged shouldered rods for connecting said corner blocks and holding said plate fulcrum bearings in accurately spaced parallelism.

7. In a scale, a platform-supporting frame comprising corner blocks having plate fulcrum bearings formed thereon, shouldered rods for connecting said corner blocks and holding said plate fulcrum bearings in accurately spaced parallelism, and a flexible stay-rod connected to one of said corner blocks and longitudinally adjustably anchored at its opposite end.

8. In a scale, a platform-supporting frame comprising corner blocks having fulcrum bearings formed thereon, shouldered rods for connecting said corner blocks and holding said bearings in accurately spaced parallelism, and a pair of stay-rods pivotally connected to one of said corner blocks, extending in transverse directions and longitudinally adjustably anchored at their opposite ends.

9. In a scale, a platform-supporting frame comprising corner blocks having convex bearings in their upper faces and depending plate fulcrum engaging bearings, shouldered rods connecting pairs of said corner blocks and holding said plate fulcrum bearings in parallelism, stay-rods for holding said corner blocks from lateral movement while permitting free vertical oscillation thereof, and a platform having concave bearings for engaging said convex bearings in alinement with said plate fulcrum.

10. In a scale, the combination with a stationary frame, of platform levers therein, fulcrum-supporting bearings projecting inward from said frame, plate fulcrums for supporting said levers upon said bearings, a platform-supporting frame, flexible plate bearings for supporting said frame upon said levers, and stay-rods pivotally engaging said platform-supporting frame and adjustably engaging said stationary frame to hold said flexible plate bearings in neutral position.

11. In a scale, the combination with a stationary frame, platform-supporting levers therein and a platform-supporting frame mounted on said levers, of a stay-rod for holding said platform-supporting frame from lateral movement, being pivotally attached thereto at one end, the opposite end of said rod being threaded, an apertured bearing on said stationary frame through which the threaded end of said rod passes, and nuts engaging the threaded portion of said stay-rod on opposite sides of said apertured bearing adjustable to longitudinally shift said rod.

12. In a scale, the combination with a frame formed of connected side-bars, of platform-supporting levers fulcrumed within said frame, a platform-supporting frame mounted on said levers comprising corner blocks, shouldered rods for connecting said corner blocks in accurately spaced parallelism, a member secured to one of said corner blocks having an eye portion, a pair of stay-rods pivotally attached to the eye portion of said member and extending in transverse directions, the opposite ends of said stay-rods being threaded, members secured to said stationary frame having apertured portions spaced therefrom, said stay-rods passing through said apertures, and nuts engaging the threaded portion of said stay-rods on opposite sides of said apertured portions, forming adjustment means for accurately positioning said platform-supporting frame.

In testimony whereof I affix my signature in presence of two witnesses.

JOHN H. A. BOUSFIELD.

Witnesses:
ERNEST E. HOLBROOK,
HORACE E. ANDERSON.

Copies of this patent may be obtained for five cents each, by addressing the "Commissioner of Patents, Washington, D. C."